(12) United States Patent
Chae et al.

(10) Patent No.: US 11,904,861 B2
(45) Date of Patent: Feb. 20, 2024

(54) APPARATUS AND METHOD FOR ESTIMATING FRICTION COEFFICIENT OF ROAD SURFACE

(71) Applicants: HYUNDAI MOTOR COMPANY, Seoul (KR); Kia Corporation, Seoul (KR)

(72) Inventors: Min Ji Chae, Incheon (KR); Hyun Su Kim, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 261 days.

(21) Appl. No.: 17/397,229

(22) Filed: Aug. 9, 2021

(65) Prior Publication Data
US 2022/0055623 A1    Feb. 24, 2022

(30) Foreign Application Priority Data

Aug. 18, 2020   (KR) ........................ 10-2020-0103412

(51) Int. Cl.
*B60W 30/18*    (2012.01)
*B60W 40/09*    (2012.01)

(52) U.S. Cl.
CPC ...... *B60W 30/18109* (2013.01); *B60W 40/09* (2013.01); *B60W 2520/28* (2013.01);
(Continued)

(58) Field of Classification Search
CPC ........... B60W 30/18109; B60W 40/09; B60W 2520/28; B60W 2520/30; B60W 2552/20; B60W 2552/35; B60W 40/068; B60W 10/18; B60W 30/18072; B60W 40/105; B60W 40/107; B60W 2050/0043; B60W 2510/083; B60W 2520/14;
(Continued)

(56) References Cited

U.S. PATENT DOCUMENTS

| 6,270,172 B1 * | 8/2001 | Shirai | ...................... F16D 66/00 |
| | | | 303/112 |
| 8,930,104 B1 * | 1/2015 | Alexander | ......... B60K 23/0808 |
| | | | 701/69 |

(Continued)

FOREIGN PATENT DOCUMENTS

| KR | 10-1897466 B1 | 9/2018 |
| KR | 10-2042288 B1 | 11/2019 |

*Primary Examiner* — Dale W Hilgendorf
*Assistant Examiner* — Frank T Glenn, III
(74) *Attorney, Agent, or Firm* — MORGAN, LEWIS & BOCKIUS LLP

(57) ABSTRACT

An apparatus and a method for estimating a road surface friction coefficient relate to an apparatus of estimating a road surface friction coefficient including an additional power control module that arbitrarily adds a braking force, which causes a wheel speed difference, to an axle of the vehicle to which the braking force is applied, and together adds a driving force that cancels the braking force to an axle of the vehicle to which the driving force is applied, when it is determined that a driving state of the vehicle is an inertial driving state, and a road surface friction coefficient estimation module that estimates the road surface friction coefficient by the wheel speed difference caused by a newly added braking force.

17 Claims, 6 Drawing Sheets

(52) U.S. Cl.
 CPC ..... *B60W 2520/30* (2013.01); *B60W 2552/20* (2020.02); *B60W 2552/35* (2020.02)
(58) Field of Classification Search
 CPC ......... B60W 2540/18; B60W 2552/40; B60W 2720/10; B60W 2720/106; B60T 2210/12; B60T 8/172; B60T 8/1763; B60Y 2300/18066
 See application file for complete search history.

(56) References Cited

U.S. PATENT DOCUMENTS

| | | | | |
|---|---|---|---|---|
| 11,427,223 | B2* | 8/2022 | Poeppel | B60W 60/00184 |
| 2001/0029419 | A1* | 10/2001 | Matsumoto | B60W 40/068 |
| | | | | 701/80 |
| 2005/0109551 | A1* | 5/2005 | Komiyama | B60K 6/445 |
| | | | | 903/910 |
| 2007/0222285 | A1* | 9/2007 | Ribbens | B60T 8/1703 |
| | | | | 303/139 |
| 2009/0084623 | A1* | 4/2009 | Dagenais | B60T 8/18 |
| | | | | 701/99 |
| 2012/0203416 | A1* | 8/2012 | Yoshimura | B60L 15/2045 |
| | | | | 903/902 |
| 2015/0336457 | A1* | 11/2015 | Ikushima | B60K 17/354 |
| | | | | 701/1 |
| 2017/0096141 | A1* | 4/2017 | Won | B60W 30/184 |
| 2019/0017561 | A1* | 1/2019 | Antanaitis | B60T 17/221 |

\* cited by examiner

APPARATUS AND METHOD FOR ESTIMATING FRICTION COEFFICIENT OF ROAD SURFACE

CROSS-REFERENCE TO RELATED APPLICATION

The present application claims priority to Korean Patent Application No. 10-2020-0103412, filed on Aug. 18, 2020, the entire contents of which is incorporated herein for all purposes by this reference.

BACKGROUND OF THE INVENTION

Field of the Invention

The present invention relates to an apparatus and a method for estimating a road surface friction coefficient, and more particularly, relates to an apparatus and a method for estimating a road surface friction coefficient that are capable of immediately utilizing a pre-estimated road surface friction coefficient for acceleration/deceleration control of a vehicle.

Description of Related Art

In general, a slip occurs as a tire slides over a road surface during the braking of a vehicle. The slip between the vehicle and the road surface is affected by a road surface friction coefficient. Accordingly, because a braking distance of the vehicle is affected by the road surface friction coefficient, there is a need to rapidly and accurately estimate the road surface friction coefficient for accurately calculating the braking distance.

Accordingly, conventional devices and methods may estimate a road surface friction coefficient by use of a wheel slip ratio in acceleration/deceleration occurring during a driver's manipulation or autonomous driving and may utilize the estimated result to control the vehicle or emergency braking.

However, after the vehicle is braked or accelerated by a driver or an autonomous driving system, the road surface friction coefficient is estimated based on the wheel slip ratio. Accordingly, the road surface friction coefficient may not be estimated in an inertial driving situation where the vehicle is not braked or accelerated.

That is, the conventional method for estimating a road surface friction coefficient based on the wheel slip ratio may be performed based on the result of the wheel slip when a wheel slip occurs when the brake for braking is operated or a driving torque for acceleration is not less than a specific level. Accordingly, in an inertial driving situation where a vehicle speed is maintained uniformly, it is difficult to estimate a road surface friction coefficient based on a wheel slip.

However, the road surface friction coefficient capable of determining a state of a road surface on which the vehicle is driving may be a factor usefully utilized for acceleration/deceleration control of the vehicle. As the road surface friction coefficient is preemptively estimated prior to acceleration/deceleration control for applying a braking force and a driving force to the vehicle, the braking distance may be shortened or the efficiency of vehicle control may be improved.

Accordingly, it is necessary to preemptively estimate the road surface friction coefficient in an inertial driving state before the vehicle is accelerated or decelerated such that the vehicle is controlled by reflecting the result of the road surface friction coefficient pre-estimated from the start of an acceleration/deceleration situation caused by a driver's manipulation or autonomous driving.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for estimating a road surface friction coefficient that includes a driving state determination module that determines a driving state of a vehicle by collecting information for grasping a driving situation of the vehicle and determines whether to estimate a road surface friction coefficient based on the determined result, an additional power control module that arbitrarily adds a braking force causing a wheel speed difference to an axle of the vehicle to which the braking force is applied, and together adds a driving force that cancels the braking force to an axle of the vehicle to which the driving force is applied, when it is determined that a driving state of the vehicle is an inertial driving state, and a road surface friction coefficient estimation module that estimates the road surface friction coefficient by the wheel speed difference caused by a newly added braking force.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a road surface friction coefficient estimation apparatus may include a driving state determination module that determines a driving state of a vehicle by collecting information for grasping a driving situation of the vehicle and determines whether to estimate a road surface friction coefficient based on the determined result, an additional power control module that arbitrarily adds a braking force, which causes a wheel speed difference, to an axle of the vehicle to which the braking force is applied, and together adds a driving force that cancels the braking force to an axle of the vehicle to which the driving force is applied, when it is determined that a driving state of the vehicle is an inertial driving state, and a road surface friction coefficient estimation module that estimates the road surface friction coefficient by the wheel speed difference caused by a newly added braking force.

In various exemplary embodiments of the present invention, the additional power control module may include a final braking force setting device setting a value of a final braking force that finally acts on the axle, to which the braking force is applied, for braking of the vehicle being driven.

In various exemplary embodiments of the present invention, the additional power control module may further include a target braking force determination device determining a target braking force to be added to the axle to which the braking force is applied such that the final braking force is configured for being applied by overcoming a current driving force applied to the vehicle, and a target driving force calculation device determining a driving force, of which a magnitude is equal to a magnitude of the target braking force and which is applied in an opposite direction in a direction of the target braking force, as a target driving force to be added to the axle, to which the driving force is applied such that a speed of the vehicle is maintained by canceling the target braking force.

In various exemplary embodiments of the present invention, the additional power control module may further include a target wheel torque calculation device determining a target braking torque and a target driving torque by multiplying the target braking force and the target driving force by a radius of each tire provided on the axle, to which the braking force is applied, and the axle to which the driving force is applied.

In various exemplary embodiments of the present invention, the additional power control module may further include a braking pressure calculation device determining a target braking pressure to be implemented in a braking device of the vehicle by dividing the target braking torque by a brake gain and a tire effective radius, and a motor torque calculation device determining a target motor torque to be implemented in an electric motor of the vehicle by dividing the target driving torque by a driving torque gear transmission ratio and a driving torque distribution ratio.

In various exemplary embodiments of the present invention, the road surface friction coefficient estimation module may include a wheel speed difference calculation device obtaining wheel speeds of the vehicle and determining a magnitude of the wheel speed difference between the wheel speeds.

In various exemplary embodiments of the present invention, the road surface friction coefficient estimation module may further include a wheel speed difference correction device determining a value of the wheel speed difference as a corrected wheel speed difference index value by multiplying the wheel speed difference determined by the wheel speed difference calculation device by a predetermined correction coefficient, depending on a magnitude of a target driving torque acting on the axle, to which the driving force is applied.

In various exemplary embodiments of the present invention, the road surface friction coefficient estimation module may further include a road surface friction coefficient estimation device determining whether a road surface on which the vehicle is driving is in a low friction state or a high friction state, by comparing the wheel speed difference index value with a preset road surface friction coefficient threshold.

According to various aspects of the present invention, a method for estimating a road surface friction coefficient may include collecting information for determining a speed of a vehicle from sensors included in the vehicle, determining whether to estimate the road surface friction coefficient by determining whether the vehicle is in an inertial driving state, based on the collected information, arbitrarily adding a braking force causing a wheel speed difference to an axle of the vehicle, to which the braking force is applied, and together adding a driving force for canceling the braking force, to an axle of the vehicle to which the driving force is applied, when it is determined that the vehicle is an inertial driving state, and estimating the road surface friction coefficient by the wheel speed difference caused by the arbitrarily added braking force.

In another exemplary embodiment of the present invention, the adding of the braking force may include setting a final braking force that finally acts on the axle, to which the braking force is applied, for braking of the vehicle being driven and determining a target braking force to be added to the axle to which the braking force is applied such that the set final braking force is configured for being applied, and a target driving force to be added to the axle, to which the driving force is applied such that a speed of the vehicle is maintained by canceling the target braking force.

In another exemplary embodiment of the present invention, the adding of the braking force may further include determining a target braking torque and a target driving torque, which are applied to each of a front wheel and a rear wheel of the vehicle, as a target wheel torque when the target braking force is added to the axle to which the braking force is applied and the target driving force is added to the axle to which the driving force is applied.

In another exemplary embodiment of the present invention, the adding of the braking force may further include determining a target braking pressure to be applied to a braking device of the vehicle as a control amount of the braking device to implement the target braking torque and determining the target motor torque to be applied to an electric motor of the vehicle as a control amount of the electric motor to implement the target driving torque.

In another exemplary embodiment of the present invention, the estimating of the road surface friction coefficient may include receiving wheel speeds of the vehicle from a wheel coupled to the axle, to which the braking force is applied, and a wheel coupled to the axle, to which the driving force is applied, and determining a magnitude of the wheel speed difference between the wheel speeds.

In another exemplary embodiment of the present invention, the estimating of the road surface friction coefficient may further include determining a value of the wheel speed difference as a corrected wheel speed difference index value by multiplying the wheel speed difference, which is determined in the determining of the magnitude of the difference between the wheel speeds, by a predetermined correction coefficient, depending on a magnitude of a target driving torque acting on the axle, to which the driving force is applied.

In another exemplary embodiment of the present invention, the estimating of the road surface friction coefficient may further include comparing the wheel speed difference index value with a preset road surface friction coefficient threshold, estimating that the road surface friction coefficient is in a low friction state, when the wheel speed difference index value is greater than the road surface friction coefficient threshold, and estimating that the road surface friction coefficient is in a high friction state, when the wheel speed difference index value is less than the road surface friction coefficient threshold.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
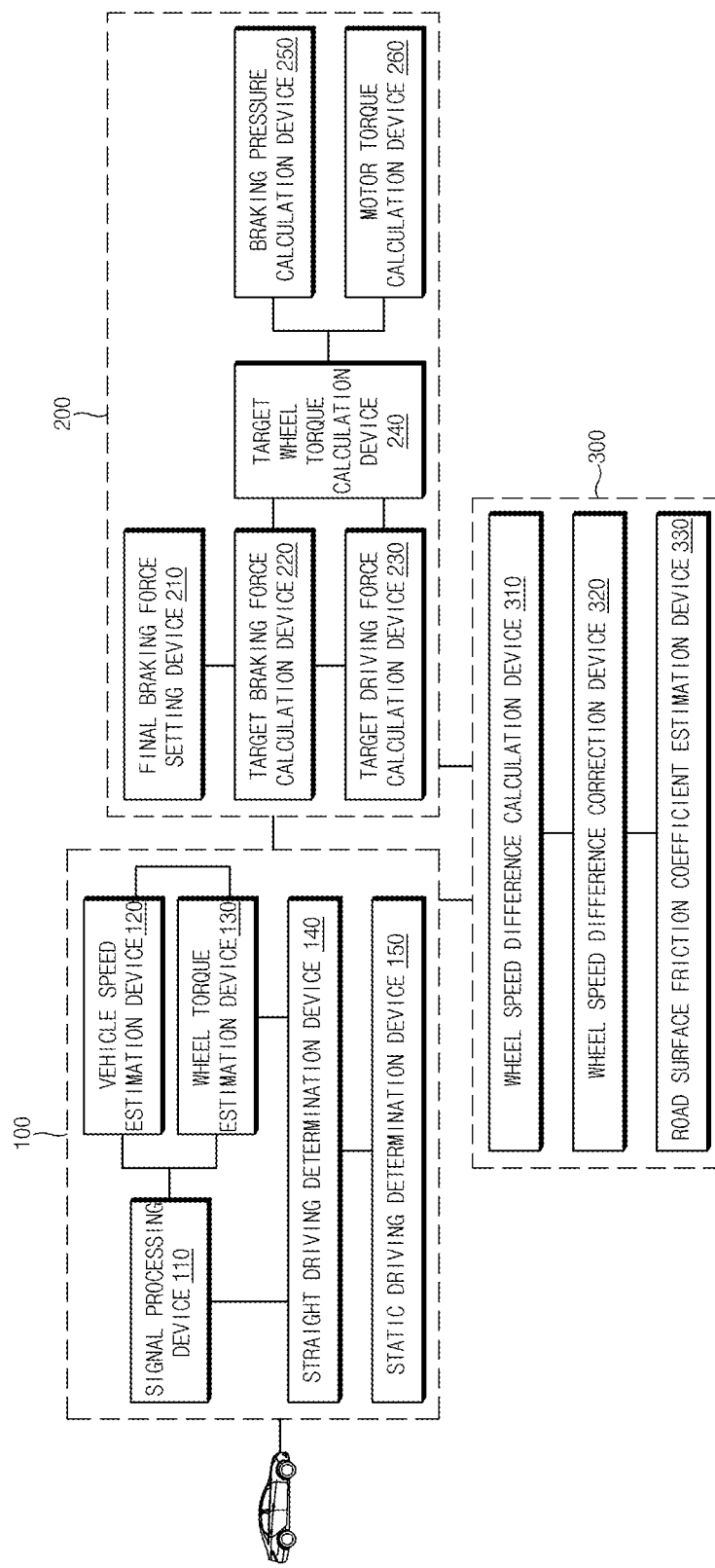
FIG. 1 is a block diagram of a road surface friction coefficient estimation apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known features or functions will be ruled out in order not to unnecessarily obscure the gist of the present invention.

In describing elements of exemplary embodiments of the present invention, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present invention belongs. It will be understood that terms used herein should be interpreted as having a meaning which is consistent with their meaning in the context of the present invention and the relevant art and will not be interpreted in an idealized or overly formal sense unless expressly so defined herein.

Hereinafter, various embodiments of the present invention will be described in detail with reference to FIGS. 1 to 6.

FIG. 1 is a block diagram of a road surface friction coefficient estimation apparatus according to various exemplary embodiments of the present invention.

Referring to FIG. 1, a road surface friction coefficient estimation apparatus according to various exemplary embodiments of the present invention may include a driving state determination module 100 that determines a driving state of a vehicle by collecting information for grasping a driving situation of the vehicle and determines whether to estimate a road surface friction coefficient based on the determined result, an additional power control module 200 that arbitrarily adds a braking force causing a wheel speed difference to an axle of the vehicle to which the braking force is applied, and together adds a driving force canceling the braking force to an axle of the vehicle to which the driving force is applied, when it is determined that a driving state of the vehicle is an inertial driving state, and a road surface friction coefficient estimation module 300 that estimates the road surface friction coefficient by the wheel speed difference caused by a newly added braking force.

The driving state determination module 100 may include a signal processing device 110 that collects information configured for estimating a speed of the vehicle being driven and information configured for estimating a driving torque at wheels of the vehicle from sensors included in the vehicle and obtains data for determining a driving state of the vehicle.

The signal processing device 110 may obtain at least one of a longitudinal acceleration or a wheel speed, which are configured for estimating a vehicle speed of the vehicle being driven, may obtain at least one of a lateral acceleration, a steering angle, a steering angular speed, or a yaw rate, which is configured for determining whether the vehicle is driving straight, and may obtain a value of a motor torque configured for determining a static driving state of the vehicle.

At the present time, the signal processing device 110 may remove a noise from data obtained from various sensors of the vehicle by use of a low pass filter (LPF) and may obtain an accurate measurement value by compensating for a sensor-specific offset.

Furthermore, the driving state determination module 100 may include a vehicle speed estimation device 120 that estimates the speed of the vehicle being driven by use of data obtained from the signal processing device 110 and a wheel torque estimation device 130 that estimates a wheel torque applied to each front wheel and each rear wheel of the vehicle being currently driven.

At the present time, the vehicle speed estimation device 120 may estimate the speed of the vehicle being driven through longitudinal acceleration, wheel speed, and the like, which are obtained from the signal processing device 110. Accordingly, the estimated speed of the vehicle may be used to determine whether the vehicle is driving in an inertial driving area where the vehicle is not accelerated or decelerated.

Moreover, the wheel torque estimation device 130 may calculate and estimate a value of a wheel torque applied to each of the front and rear wheels of the vehicle by a driving torque generated by an engine or an electric motor which is a driving source. Accordingly, the estimated wheel torque value of each of the front and rear wheels may be used to determine whether the vehicle is in a static driving state where the vehicle rotates at a constant angular speed.

At the present time, the wheel torque estimation device 130 may determine the value of the wheel torque applied to each of the front and rear wheels by multiplying the driving source driving torque by a driving torque gear transmission ratio and a driving torque distribution ratio of a front wheel to a rear wheel.

That is, the wheel torque estimation device 130 may determine a value of a wheel torque applied to each of the front and rear wheels of the vehicle by the driving source driving torque generated by an engine or an electric motor of the vehicle. At the instant time, after a value of a driving source driving torque $T_{drv}$ is obtained by use of an engine torque and a motor torque obtained from the signal processing device 110 when the vehicle is a hybrid vehicle, or by use of a motor torque obtained from the signal processing device 110 when the vehicle is an electric vehicle, both a front wheel torque sum $T_{axle,Fr}$ and a rear wheel torque sum $T_{axle,Rr}$ may be obtained by Equation 1 below.

$$T_{axle,Fr} = T_{drv} N_{Gear} r_{awd,f}$$

$$T_{axle,Rr} = T_{drv} N_{Gear} r_{awd,r}$$ [Equation 1]

At the present time, in Equation 1, $T_{axle,Fr}$ denotes a front wheel torque sum; $T_{axle,Rr}$ denotes a rear wheel torque sum; and Tar, denotes a driving source driving torque. Furthermore, $N_{Gear}$ denotes a gear transmission ratio of an axle driving torque; $r_{awd,f}$ denotes a distribution ratio of a driving torque front wheel; and $r_{awd,r}$ denotes a distribution ratio of a driving torque rear wheel. Moreover, $r_{awd,f}$ and $r_{awd,r}$ is the distribution ratio of a driving torque, and thus it is natural that the sum of $r_{awd,f}$ and $r_{awd,r}$ is 1.

Accordingly, the front wheel torque sum and the rear wheel torque sum obtained by the wheel torque estimation device 130 may indicate the wheel torque applied to the vehicle which is currently driving. The front wheel torque sum and the rear wheel torque sum may be used to determine the current driving state of the vehicle.

Besides, the driving state determination module 100 may further include a straight driving determination device 140 that determines whether the vehicle is currently driving straight, based on data obtained through the signal processing device 110.

To the end, as shown in Equation 2 below, the straight driving determination device 140 may compare a lateral acceleration $a_y$, a yaw rate $\gamma$, a steering angular speed $\delta_f$, and a vehicle speed $V_x$, which are obtained through the signal processing device 110 with a preset lateral acceleration reference value $a_{y,thd}$, a preset yaw rate reference value $\gamma_{y,thd}$, a preset steering angular speed reference value $\delta_{f,thd}$, and a preset vehicle speed reference value $V_{x,thd}$, respectively. When each of values of the lateral acceleration, the yaw rate, and the steering angular speed is not greater than a reference value, and the vehicle speed $V_x$ is not less than a reference value, the straight driving determination device 140 may determine that the vehicle is driving straight.

$$\text{StrghtDrvFlag} = |a_y| \leq a_{y,thd}, |\gamma| \leq \gamma_{y,thd}, |\delta_f| \leq \delta_{f,thd} \text{ and } |V_x| \geq V_{x,thd}$$ [Equation 2]

Also, the driving state determination module 100 may further include a static driving determination device 150 that determines whether the vehicle is in a static driving state where the vehicle rotates at a constant angular speed, by comparing the current wheel torque value of the vehicle being driven with a predetermined reference value when the result determined by the straight driving determination device 150 indicates that the vehicle is driving straight (StrghtDrvFlag==1).

To the end, as shown in Equation 3 below, the static driving determination device 150 may compare the front wheel torque sum $T_{axle,Fr}$ and the rear wheel torque sum $T_{axle,Rr}$, which are determined by the wheel torque estimation device 130, with a predetermined reference value $T_{axle,thd}$ of the front wheel torque sum and a predetermined reference value $T_{axle,thd}$ of the rear wheel torque sum, respectively. When each of the values is not greater than a reference value, the static driving determination device 150 may determine that the vehicle is in a static driving state.

$$\text{StaticDrvFlag} = |T_{axle,Fr}| \leq T_{axle,thd}, |T_{axle,Rr}| \leq T_{axle,thd} \text{ and StrghtDrvFlag}==1$$ [Equation 3]

Accordingly, when the straight driving determination device 140 determines that the vehicle currently driving is in a straight driving state and when the static driving determination device 150 determines that the vehicle is in a static driving state where the vehicle is driving straight at a constant speed and then rotates at a constant angular speed, based on the wheel torque value of the vehicle, the driving state determination module 100 determines that the corresponding vehicle is in the inertial driving state and then may estimate a road surface friction coefficient.

At the present time, when the result determined by the straight driving determination device 140 indicates that it is determined that the vehicle is not in a straight driving state, or when the result determined by the static driving determination device 150 indicates it is determined that the vehicle is not in a static driving state, such as the vehicle being accelerated or decelerated, even though the vehicle is in the straight driving state, the driving state determination module 100 may determine that the vehicle is not in an inertial driving state, may stop estimating a road surface friction coefficient, and may utilize a road surface friction coefficient, which is estimated just previously, or a road surface friction coefficient set by default, for vehicle control.

Moreover, the additional power control module 200 and the road surface friction coefficient estimation module 300 may simultaneously apply a braking force and a driving force, which are the same magnitude as each other, to the vehicle determined to be in an inertial driving state and may make the total sum value of the braking force and the driving force, which are additionally applied to the vehicle to be '0', estimating a road surface friction coefficient based on a difference in wheel speed caused by the added braking force in a state where a driver does not feel the sense of the sense of difference due to the added power because there is no change in a speed of the vehicle being driven.

Accordingly, in an inertial driving state before an acceleration/deceleration manipulation by a driver or autonomous driving, the road surface friction coefficient may be estimated in advance by cooperative control for applying both the braking force and the driving force to a driving motor of an eco-friendly vehicle.

Accordingly, a current situation of a change in power applied to both the front wheel and the rear wheel, and a current situation of the total power caused by the current situation of the power change, by adding, by the additional power control module 200, the braking force and the driving force, which have a specific magnitude, to the vehicle in the inertial driving state will be described with reference to FIG. 2.

Figure 2:
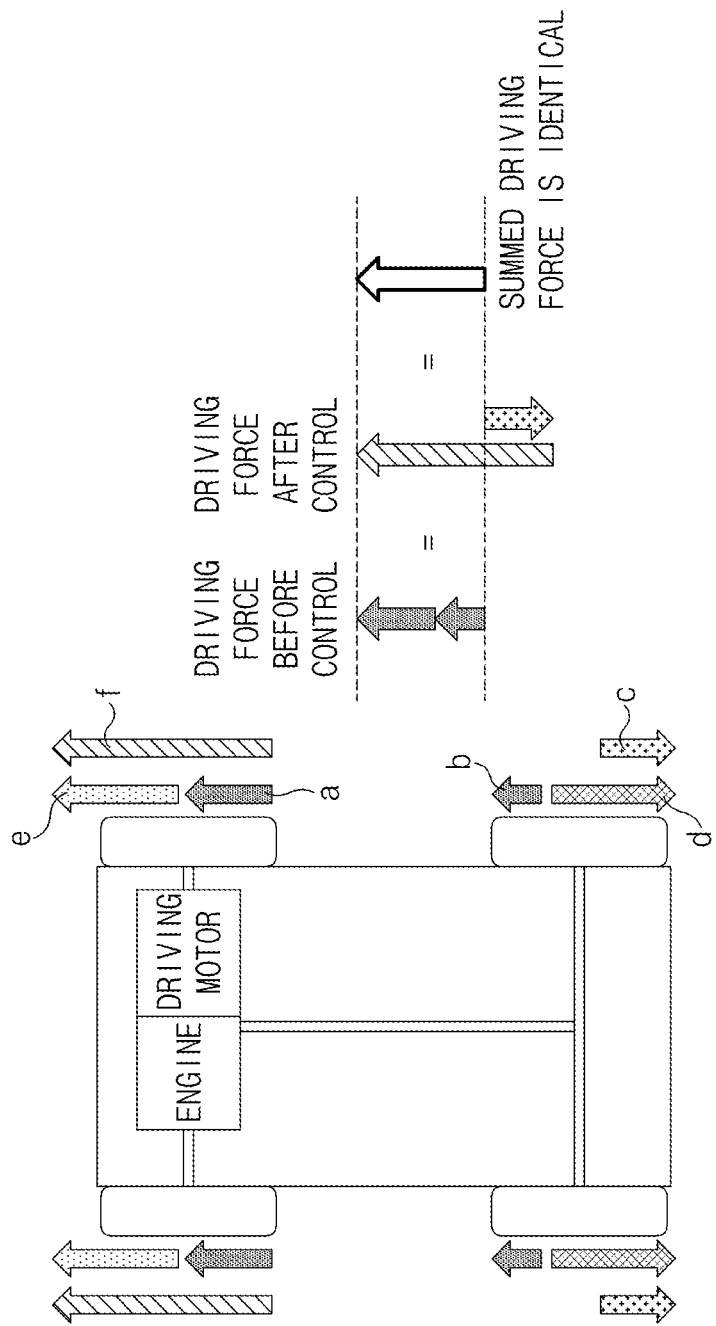
FIG. 2 is a schematic diagram illustrating a sum of a total power and a power additionally applied to front and rear wheels of a vehicle, according to various exemplary embodiments of the present invention.
Figure 3:
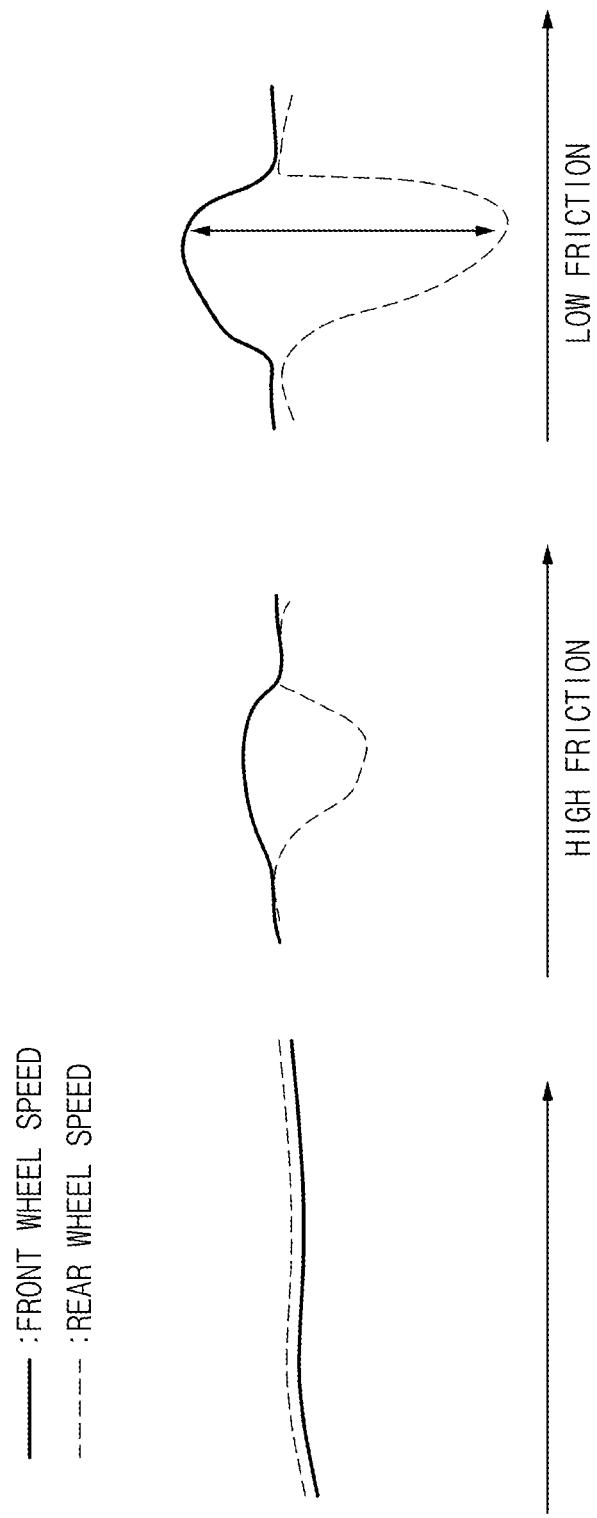
FIG. 3A, FIG. 3B and FIG. 3C are diagrams illustrating a change in wheel speed measured before and after an additional power is applied to a vehicle, according to various exemplary embodiments of the present invention.

An exemplary embodiment included in FIG. 2 describes that a target braking force is added to an axle of the vehicle, to which the braking force is applied, by a driving motor included in an engine, and a target driving force is added to an axle of the vehicle, on which the driving force is applied, by setting a rear wheel as the axle on which the braking force is applied, and setting a front wheel as the axle on which the driving force is applied, based on an all-wheel drive (AWD)

vehicle. Accordingly, it is natural that the road surface friction coefficient estimated by applying a target braking force and a target driving force corresponding to the target braking force is applied to both a 4WD vehicle or a 2WD vehicle as well as an AWD vehicle illustrated in FIG. 2.

As illustrated in FIG. 2, the driving force applied to the vehicle in an inertial driving state may be expressed as a front wheel current driving force $F_{x,Fr}$ indicated by arrow 'a' on sides of front wheels and a rear wheel current driving force $F_{x,Rr}$ indicated by arrow 'b' on sides of rear wheels. Accordingly, as shown in a driving force before control is displayed on the right side, the current total driving force applied to the vehicle in an inertial driving state may be expressed as the sum of arrow 'a' and arrow 'b'.

While a current driving force of a rear wheel applied to the vehicle is overcome, the amount of the target braking force corresponding to arrow 'd' needs to be added to the rear wheel to the extent to which a braking force reaches the final braking force such that a final braking force indicated by arrow 'c' is be finally applied to the rear wheel to estimate a road surface friction coefficient of the vehicle. Accordingly, the target braking force added to the rear wheel applied in an opposite direction to an direction of the driving force, and thus only the final braking force in the opposite direction to an direction of the driving direction of the vehicle is applied after the current braking force of the rear wheel is canceled in the rear wheel.

Also, because the driving force of the entire vehicle is reduced by the target braking force applied to the rear wheel, the vehicle speed is changed. To prevent the above change, it is possible to add a target driving force, which has a magnitude corresponding to a magnitude of the target braking force added to the rear wheel and of which the direction is the same as a driving direction of the vehicle, to the front wheel. Accordingly, in the front wheel, the target driving force indicated by arrow 'e' is added to the front wheel current driving force indicated by arrow 'a'. As indicated by arrow 'f', the final driving force increased as compared to an inertial driving applied to the front wheel.

As a result, because a force applied to the rear wheel of the vehicle by the target braking force is canceled by a force applied to the front wheel of the vehicle by the target driving force, as shown on the right side of FIG. 2, the vehicle maintains the same state as a state where the driving force is summed before the target braking force and target driving force have been added, as a whole. Accordingly, the road surface friction coefficient may be estimated in a state where a driver does not feel the sense of difference caused due to a change in vehicle speed.

The additional power control module 200 may include a final braking force setting device 210 that sets a value of a final braking force $F_{brk}$ that finally acts on an axle of the vehicle, to which the braking force is applied, for the braking of the vehicle being driven.

Accordingly, the value of the final braking force $F_{brk}$ set by the final braking force setting device 210 may be used to induce a wheel speed difference for estimating the road surface friction coefficient. The value of the final braking force $F_{brk}$ is set not to affect the speed of the vehicle in an inertial driving state, and thus is not set to a value excessively great to cause damage to a tire.

Furthermore, the additional power control module 200 may further include a target braking force calculation device 220 that determines a target braking force $F_{x,RrTgt}$ to be added to an axle of the vehicle to which the braking force is applied such that the final braking force $F_{brk}$ is configured for being applied by overcoming a current driving force applied to the vehicle, and a target driving force calculation device 230 that determines a target driving force $F_{x,FrTgt}$ to be added to the axle to which the driving force is applied such that a speed of the vehicle is maintained by canceling the target braking force $F_{x,RrTgt}$.

At the present time, the target braking force $F_{x,RrTgt}$ determined by the target braking force calculation device 220 may need to overcome the current driving force $F_{x,Rr}$ acting on the vehicle in an inertial driving state, and may be determined as a braking force, of which a specific magnitude is greater than the current driving force and which is applied in an opposite direction in a direction of the current driving force.

Besides, the target driving force $F_{x,FrTgt}$ determined by the target driving force calculation device 230 may be used to cancel the target braking force and may be determined as a driving force, of which a specific magnitude is equal to the magnitude of the target braking force and which is applied in an opposite direction in a direction of the target braking force.

At the present time, as shown in Equation 4 below, the front wheel current driving force $F_{x,Fr}$ may be obtained by dividing the front wheel torque sum $T_{axle,Fr}$ determined by the wheel torque estimation device 130 by a front wheel tire radius $R_{tire,Fr}$; and the rear wheel current driving force $F_{x,Rr}$ may be obtained by dividing the rear wheel torque sum $T_{axle,Rr}$ determined by the wheel torque estimation device 130, by a rear wheel tire radius $R_{tire,Rr}$.

Moreover, because there are two wheels on each rear wheel and each front wheel, the rear wheel current driving force $F_{x,Rr}$ and the front wheel current driving force $F_{x,Fr}$ acting on each wheel may be obtained by dividing the determined value by 2.

[Equation 4]

$$F_{x,Fr} = \frac{T_{axle,Fr}}{2R_{tire,Fr}} \quad (a)$$

$$F_{x,Rr} = \frac{T_{axle,Rr}}{2R_{tire,Rr}} \quad (b)$$

$$F_{brk} \quad (c)$$

$$F_{x,RrTgt} = F_{brk} - F_{x,Rr} \quad (d)$$

$$F_{x,FrTgt} = -F_{x,RrTgt} \quad (e)$$

$$F_{x,Fr} + F_{x,FrTgt} \quad (f)$$

$$T_{w,FrTgt} = F_{x,FrTgt} \cdot R_{tire,Fr} \quad (g)$$

$$T_{x,RrTgt} = F_{x,FrTgt} \cdot R_{tire,Rr} \quad (h)$$

Accordingly, as described in Equation 4, the target braking force calculation device 220 may determine the rear wheel target braking force $F_{x,RrTgt}$ by subtracting the rear wheel current driving force $F_{x,Rr}$ from the final braking force $F_{brk}$. That is, the braking force may be applied in an opposite direction in a direction of the current driving force acting on the vehicle, and thus the rear wheel target braking force to be added may be obtained by subtracting the rear wheel current driving force from the final braking force.

Furthermore, as described in Equation 4, the target driving force calculation device 230 may determine a front wheel target driving force $F_{x,FrTgt}$, which has the same magnitude as the rear wheel target braking force $F_{x,RrTgt}$ determined by the target braking force calculation device 220 and which is applied in an opposite direction in a direction of the rear wheel target braking force $F_{x,RrTgt}$, to cancel the target braking force added to an axle of the vehicle to which the braking force of the vehicle is applied.

Moreover, the additional power control module 200 may further include a target wheel torque calculation device 240 that determines a wheel torque acting on each front wheel and each rear wheel when the target braking force is to be added to an axle of the vehicle to which the braking force is applied and when the target driving force is to be added to an axle of the vehicle to which the driving force is applied.

At the present time, the target wheel torque calculation device 240 may determine a target braking torque $T_{w,RrTgt}$ by multiplying the target braking force $F_{x,RrTgt}$ determined by the target braking force calculation device 220 by a radius of each tire provided on the axle, to which the braking force is applied; and the target wheel torque calculation device 240 may determine a target driving torque $T_{w,FrTgt}$ by multiplying the target driving force $F_{x,FrTgt}$ determined by the target driving force calculation device 230, by a radius of each tire provided on the axle to which the driving force is applied.

Accordingly, as described in Equation 4, the target wheel torque calculation device 240 may determine the rear wheel target braking torque $T_{w,RrTgt}$ by multiplying the rear wheel target braking force $F_{x,RrTgt}$ and the rear wheel tire radius $R_{tire,Rr}$ and may determine the front wheel target driving torque $T_{w,FrTgt}$ by multiplying the front wheel target braking force $F_{x,FrTgt}$ and the front wheel tire radius $R_{tire,Fr}$.

Also, the additional power control module 200 may determine a target braking pressure to be applied to a braking device and a motor torque to be applied to an electric motor to implement the target wheel torque determined by the target wheel torque calculation device 240.

To the end, the additional power control module 200 may include a braking pressure calculation device 250 that determines a target braking pressure to be implemented in a braking device of the vehicle by dividing the target braking torque by a brake gain and a tire effective radius and a motor torque calculation device 260 that determines a target motor torque to be implemented in an electric motor of the vehicle by dividing the target driving torque by a driving torque gear transmission ratio and a driving torque distribution ratio.

Accordingly, as shown in Equation 5 below, the braking pressure calculation device 250 may determine a target braking pressure $P_{brk,Tgt}$ by dividing the rear wheel target braking torque $T_{w,RrTgt}$ by a rear wheel brake gain $K_{brk,Rr}$ (that is proportional to the number of pistons of a brake, the size of a piston, and a coefficient of a friction material) and a rear wheel tire effective radius $R_{in,Rr}$.

[Equation 5]

$$P_{brk,Tgt} = \frac{T_{w,RrTgt}}{K_{brk,Rr} \cdot R_{in,Rr}},$$

$$T_{mot,Tgt} = \frac{T_{w,FrTgt}}{N_{Gear} \cdot r_{awd,f}},$$

$$T_{dvr,Tgt} = T_{dvr} + T_{mot,Tgt},$$

$$r_{awd,f,tgt} = \frac{T_{w,FrTgt}}{T_{drv,Tgt}},$$

$$r_{awd,r,tgt} = 1 - r_{awd,f,tgt},$$

Besides, as illustrated in Equation 5, the motor torque calculation device 260 may determine a target motor torque $T_{mot,Tgt}$ by dividing the front wheel target driving torque $T_{w,FrTgt}$ by a driving torque gear transmission ratio $N_{Gear}$ and a driving torque front wheel distribution ratio $r_{awd,f}$.

Accordingly, as well as the target braking pressure $P_{brk,Tgt}$ determined by the braking pressure calculation device 250 is applied to a braking device such as an anti-lock brake system (ABS) such that the braking occurs, the target motor torque $T_{mot,Tgt}$ determined by the motor torque calculation device 260 is applied to an electric motor provided in an eco-friendly vehicle to increases the torque of the electric motor generating a driving force.

That is, to maintain an inertial driving state of the vehicle, the electric motor is currently generating the driving source driving torque $T_{drv}$ obtained from the signal processing device 110. Herein, because the target motor torque $T_{mot,Tgt}$ determined by the motor torque calculation device 260 needs to be additionally generated, as described in Equation 5, the electric motor may generate the target driving source driving torque $T_{drv,Tgt}$ that corresponds to the sum of the driving source driving torque $T_{drv}$ and the target motor torque $T_{mot,Tgt}$.

Moreover, the target driving source driving torque $T_{drv,Tgt}$ corresponding to the sum of driving torques generated by the electric motor is applied to the front and rear wheels of the vehicle by a target driving torque front wheel distribution ratio $r_{awd,f,tgt}$ and a target driving torque rear wheel distribution ratio $r_{awd,f,tgt}$, which are determined as described in Equation 5.

Accordingly, the braking pressure and the motor torque that are determined by the braking pressure calculation device 250 and the motor torque calculation device 260 may be applied to actuators of a braking device and an electric motor, respectively; and the braking pressure and the motor torque may actuate the braking device and the electric motor depending on determined conditions, respectively.

Furthermore, the road surface friction coefficient estimation module 300 may compare a wheel speed of a wheel connected to an axle of the vehicle, to which the braking force is applied, with a wheel speed of a wheel connected to an axle of the vehicle, to which the driving force is applied, after the determined braking pressure and the determined motor torque are applied, and may estimate a road surface friction coefficient based on the compared difference.

Figure 4:
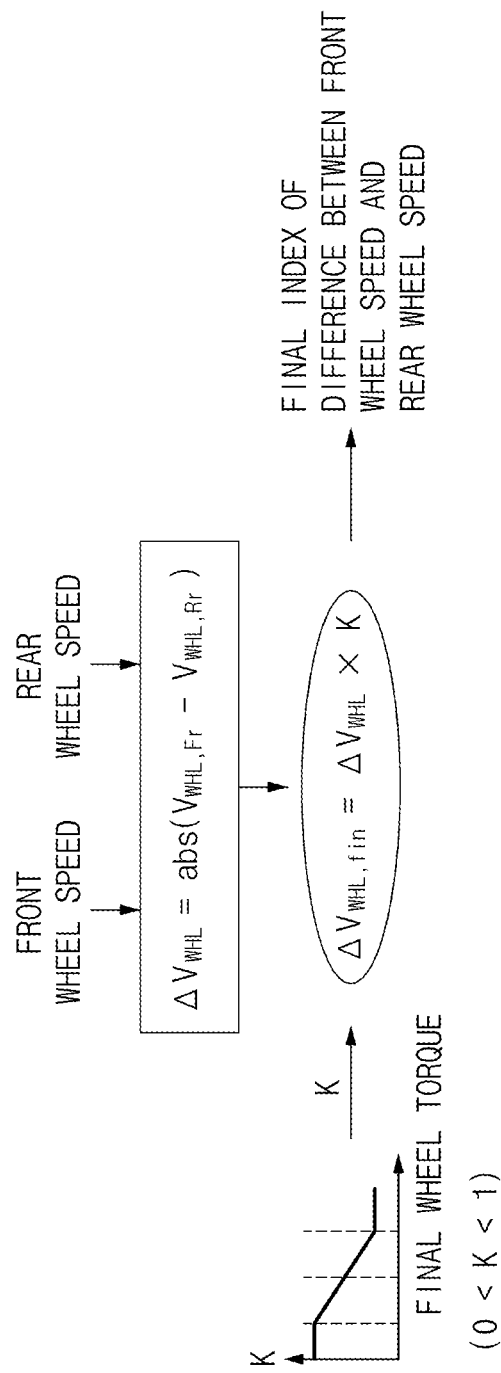
FIG. 4 is a view exemplarily illustrating deriving a final index through correction of a wheel speed difference, according to various exemplary embodiments of the present invention.

The road surface friction coefficient estimation module 300 may include a wheel speed difference calculation device 310 that receives wheel speeds through the signal processing device 110 and determines a magnitude of a difference between the wheel speeds. To the end, as illustrated in FIG. 4, the wheel speed difference calculation device 310 may obtain a wheel speed difference $\Delta V_{WHL}$ by determining an absolute value of a value from subtracting a wheel speed $V_{WHL,Rr}$ of the rear wheel from a wheel speed $V_{WHL,Fr}$ of the front wheel.

Because there is no difference in wheel speed between the front and rear wheels in an inertial driving state where a vehicle is driving straight, as illustrated in FIG. 3A, the front wheel speed (displayed as a solid line) and the rear wheel speed (displayed as a dotted line) maintain a uniformly-gathered state without a difference.

However, the braking pressure is applied to a braking device of the vehicle by the additional power control module 200, and thus a braking torque occurs on an axle of the vehicle, to which a braking force is applied. A motor torque is applied to an electric motor, and thus a driving force is added to an axle of the vehicle to which the driving torque is applied. In the instant case, a difference in wheel speed between the front and rear wheels may occur.

Also, the above-described difference between the front wheel speed and the rear wheel speed is measured differently depending on an extent, to which the front wheel speed is different from the rear wheel speed depending on a friction coefficient of a road surface contacted by a tire.

Accordingly, as illustrated in FIG. 3C, in the case of a low friction road surface, while the added braking force and the added driving force are not sufficiently transmitted to a road surface and are lost due to the wheel speed difference, the wheel speed difference between the front wheel and the rear wheel may be measured in a state where a line of the front wheel speed indicated by the solid line is greatly spaced from a line of the rear wheel speed indicated by the dotted line.

As illustrated in FIG. 3B, in the case of a high friction road surface, because the added braking force and the added driving force are transmitted to the road surface with an appropriate slip, the wheel speed difference between the front wheel and the rear wheel may be measured in a state where the line of the front wheel speed indicated by the solid line is slightly spaced from the line of the rear wheel speed indicated by the dotted line.

Accordingly, while a value of the wheel speed difference $\Delta V_{WHL}$, which indicates a difference between the front wheel speed $V_{WHL,Fr}$ and the rear wheel speed $V_{WHL,Rr}$ and which is determined by the wheel speed difference calculation device 310, is compared with the experimentally-obtained value in a low friction state or in a high friction state, the road surface friction coefficient may be estimated.

Furthermore, the road surface friction coefficient estimation module 300 may further include a wheel speed difference correction device 320 that determines a wheel speed difference index value, in which a value of the wheel speed difference is corrected, by multiplying the wheel speed difference determined by the wheel speed difference calculation device 310 by an experimentally-determined correction coefficient depending on a magnitude of a target driving torque acting on an axle of the vehicle, to which the driving force is applied.

As the driving force added to an axle of the vehicle, to which the driving force is applied, is great, a value of the driving torque applied to a wheel coupled to the axle, to which the driving force is applied, may increase. When the excessive driving torque is applied to the wheel, the wheel speed may be reduced. For the present reason, it may be difficult to distinguish whether a wheel speed difference determined by the wheel speed difference calculation device 310 is due to friction with a road surface or excessive driving torque.

Accordingly, when the sum (i.e., a value of the final driving torque which is the sum of a current driving torque applied in the inertial driving state and the target driving torque to be added) of driving torques applied to an axle of the vehicle, to which the driving force is applied, is small, the wheel speed difference correction device 320 may determine a wheel speed difference index value by applying a relatively high correction coefficient K (a value close to 1) among correction coefficients having values between 0 and 1; alternatively, when the value of the final driving torque is great, the wheel speed difference correction device 320 may determine a wheel speed difference index value by applying a relatively low correction coefficient K (a value close to 0) among correction coefficients having values between 0 and 1.

Accordingly, a wheel speed difference component caused by the excessive driving torque, not by friction with the road surface, may be minimally reflected to the estimation of the road surface friction coefficient, by differently applying a correction coefficient depending on a magnitude of the final driving torque.

At the present time, as shown in a graph of the correction coefficient K illustrated in FIG. 4, the correction coefficient multiplied to correct the wheel speed difference determined in the wheel speed difference calculation device 310 may be obtained by experimentally obtaining an extent to which the wheel speed difference varies due to a wheel speed reduction caused by an increase in the final driving torque.

Moreover, the correction coefficient K obtained through the above method may be set to a value between 0 and 1. When the final driving torque is small such as smaller than a reference value, the wheel speed difference may mainly depend on a friction force with a road surface, and thus it may be seen that a significant part of the determined wheel speed difference is obtained by the road surface friction coefficient. Accordingly, the correction coefficient K may be assigned to a value close to 1. When the final driving torque is great such as greater than a reference value, it may be seen that the influence of excessive driving torque in the values of the determined wheel speed differences will increase. Accordingly, the correction coefficient K may be assigned to a value close to 0.

Accordingly, the wheel speed difference correction device 320 may extract a value of the correction coefficient K derived in advance on a graph by use of the value of the final driving torque and then may determine a wheel speed difference index value which is a value corrected by multiplying the value and the wheel speed difference $\Delta V_{WHL}$ determined by use of the wheel speed value obtained by the signal processing device 110.

Also, the road surface friction coefficient estimation module 300 may further include a road surface friction coefficient estimation device 330 that determines whether a road surface on which the vehicle is driving is in a low friction state or a high friction state, by comparing a wheel speed difference index value determined by the wheel speed difference correction device 320 with a preset road surface friction coefficient threshold.

At the present time, the road surface friction coefficient threshold may be a value which is a criterion for distinguishing between low friction and high friction, and may be set to a value within a specific range obtained through repeated experiments in a vehicle driving on a road surface.

The road surface friction coefficient estimation device 330 may compare the wheel speed difference index with the road surface friction coefficient threshold. When the wheel speed difference index is greater than the road surface friction coefficient threshold, the road surface friction coefficient estimation device 330 may determine that the road surface friction coefficient is in a low friction state. When the wheel speed difference index is less than the road surface friction coefficient threshold, the road surface friction coefficient estimation device 330 may determine that the road surface friction coefficient is in a high friction state.

Accordingly, a braking device or a driving device may be controlled depending on the estimated road surface friction coefficient upon controlling acceleration/deceleration by a driver or autonomous driving by the determined road surface friction coefficient.

Next, a method of estimating a road surface friction coefficient according to various exemplary embodiments of the present invention will be described with reference to FIG. 5.

Figure 5:
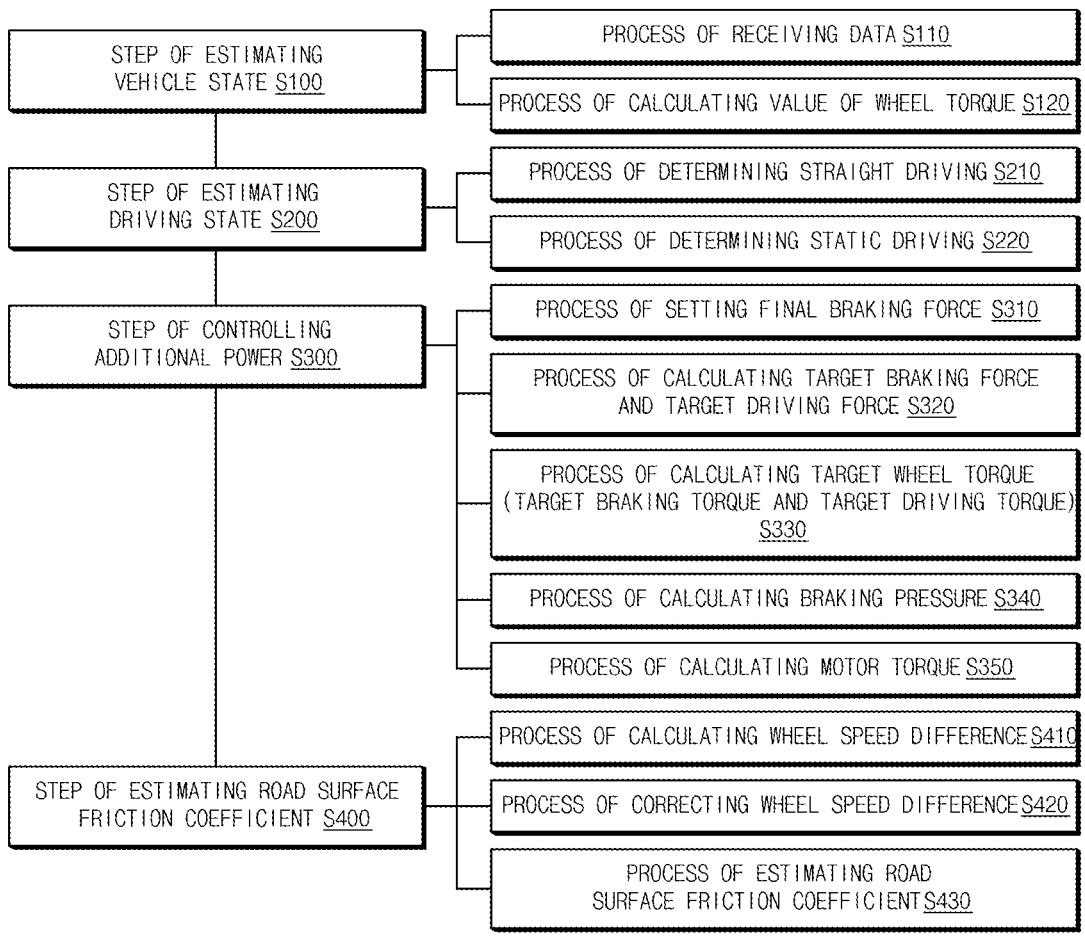
FIG. 5 is a schematic diagram of a method for estimating a road surface friction coefficient, according to various exemplary embodiments of the present invention.
Figure 6:
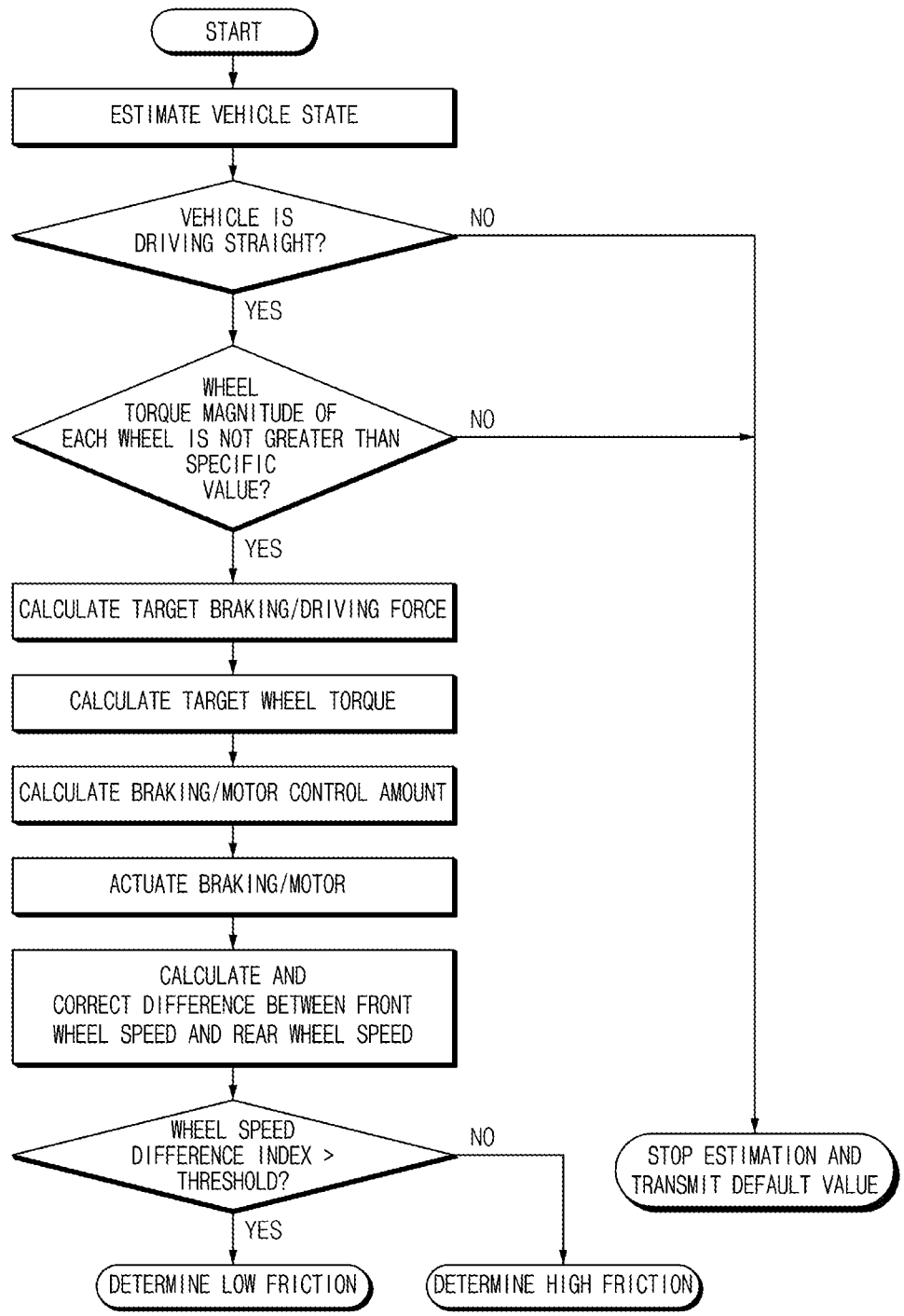
FIG. 6 is a flowchart illustrating a working mechanism of a method for estimating a road surface friction coefficient according to various exemplary embodiments of the present invention.

FIG. 5 is a schematic diagram of a method for estimating a road surface friction coefficient, according to various exemplary embodiments of the present invention. FIG. 6 is a flowchart illustrating a working mechanism of a method for estimating a road surface friction coefficient according to various exemplary embodiments of the present invention.

Referring to FIG. 5 and FIG. 6, according to various exemplary embodiments of the present invention, a method for estimating a road surface friction coefficient may include a vehicle state estimating step S100 of collecting information for determining a speed of a vehicle from sensors included in the vehicle, a driving state estimating step S200 of determining whether to estimate the road surface friction coefficient by determining whether the vehicle is in an inertial driving state based on the collected information, an additional power controlling step S300 of arbitrarily adding a braking force causing a wheel speed difference to an axle of the vehicle, to which the braking force is applied, and together adding a driving force for canceling the braking force, to an axle of the vehicle to which the driving force is applied, when it is determined that the vehicle is an inertial driving state, and a road surface friction coefficient estimating step S400 of estimating the road surface friction coefficient by the wheel speed difference caused by a newly added braking force.

At the present time, the vehicle state estimating step S100 may include obtaining a longitudinal acceleration and a wheel speed, which are configured for estimating the vehicle speed of the vehicle being driven, from various sensors provided in the vehicle, obtaining a lateral acceleration, a steering angle, a steering angular speed, and a yaw rate configured for determining whether the vehicle is traveling straight, and obtaining a value of a motor torque (a driving source driving torque) configured for determining whether the vehicle is in a static driving state (S110).

Accordingly, the obtained information may be used to determine whether a vehicle is in an inertial driving state, in the driving state estimating step S200, and may be used for various determinations for determining the amount of control applied to a braking device and an electric motor to add a braking force and a driving force to the vehicle, in the additional power controlling step S300.

At the present time, the vehicle state estimating step S100 may further include a step S120 of determining a value of a wheel torque applied to each of the front and rear wheels of the vehicle by a motor torque (i.e., driving source driving torque) collected from a sensor included in the vehicle.

Furthermore, the driving state estimating step S200 may include a step S210 of determining whether the vehicle is currently driving straight, based on the collected information and a step S220 of determining whether the vehicle is in a static driving state, when it is determined that the vehicle is driving straight.

To the end, the step S210 of determining of whether the vehicle is currently driving straight may include comparing a lateral acceleration, a yaw rate, a steering angular speed, and a vehicle speed of the vehicle with predetermined reference values, respectively, and determining that the vehicle is in a straight driving state when the values of a lateral acceleration, a yaw rate, and a steering angular speed are not greater than a reference value, and the vehicle speed is not less than a reference value.

Moreover, a step S220 of determining of whether the vehicle is in the static driving state may include comparing a value of a wheel torque of each of the front and rear wheels determined by use of the driving source driving torque with a predetermined reference value and determining that the vehicle is in a static driving state when the value is not greater than the reference value.

At the present time, when it is determined, in the driving state estimation step S200, that the vehicle is driving straight and is in a static driving state, the method proceeds with subsequent step S300 and step S400 of estimating a road surface friction coefficient as shown in a flowchart of FIG. 6.

However, when it is determined that the vehicle is not driving straight or when it is determined that the vehicle is not in a static driving state because a wheel torque value of each of front and rear wheels is not greater than a specific reference value, as shown in FIG. 6, the method may include stopping estimating a new road surface friction coefficient and utilizing a road surface friction coefficient, which is estimated just previously, or a road surface friction coefficient set by default, for vehicle control.

Besides, the additional power controlling step S300 may include a step S310 of setting a final braking force that finally acts on the axle, to which the braking force is applied, for braking of the vehicle being driven and a step S320 of determining a target braking force to be added to the axle to which the braking force is applied such that the set final braking force is configured for being applied, and a target driving force to be added to the axle, to which the driving force is applied such that a speed of the vehicle is maintained by canceling the target braking force.

At the present time, the step S310 of setting a final braking force may include arbitrarily setting a value of the final braking force finally applied to an axle of the vehicle, to which the vehicle which is driving is applied, in an inertial driving state. Accordingly, the set value of the final braking force may be selected as a value of an appropriate magnitude configured for causing friction with a road surface rather than an excessively-great value such that a tire is prevented from being damaged due to sudden braking of a vehicle being driven.

Also, the step S320 of determining the target braking force and the target driving force may include first determining a current driving force applied to each of a front wheel and a rear wheel by dividing a value of a wheel torque applied to each of the front wheel and the rear wheel determined in the vehicle state estimating step S100 by a radius of each tire to determine the target braking force and target driving force. Accordingly, the target braking force and the target driving force may be determined by use of the determined current driving force of each of the front wheel and rear wheel.

Accordingly, the step S320 of determining the target braking force and the target driving force may include first determining the target braking force by subtracting a current driving force of the rear wheel, which is an axle to which the braking force is applied, from the final braking force. Moreover, the driving force, which the magnitude is equal to the magnitude of the determined target braking force and which is applied in an opposite direction of the determined target braking force, may be determined as a target driving force added to the front wheel which is an axle to which the driving force is applied.

Accordingly, in the step S320 of determining the target braking force and the target driving force, the sum of the added powers becomes 0 in the entire vehicle, by determining the target braking force and the target driving force, which have the same magnitude as each other and are applied in directions opposite to each other, as additional powers. Accordingly, the vehicle speed is not changed.

Furthermore, the additional power controlling step S300 may further include a step S330 of determining a target braking torque and a target driving torque, which are applied to each of a front wheel and a rear wheel of the vehicle, as a target wheel torque when the target braking force is added to the axle to which the braking force is applied and the target driving force is added to the axle to which the driving force is applied.

To the end, the step S330 of determining the target wheel torque may include a step of determining the target braking torque by multiplying the target braking force by a radius of a wheel coupled to an axle of the vehicle, to which the braking force is applied, and a step of determining the target driving torque by multiplying the target driving force by a radius of a wheel coupled to an axle of the vehicle to which the driving force is applied.

Furthermore, the additional power controlling step S300 may further include a step of determining a target braking pressure to be applied to a braking device of the vehicle as a control amount of the braking device to implement the target braking torque and a step of determining the target motor torque to be applied to an electric motor of the vehicle as a control amount of the electric motor to implement the target driving torque.

To the end, the step of determining the control amount may include a braking pressure determining step S340 of determining a target braking pressure to be implemented in a braking device of the vehicle by dividing the target braking torque by a brake gain and a tire effective radius and a motor torque determining step S350 of determining a target motor torque to be implemented in an electric motor of the vehicle by dividing the target driving torque by a driving torque gear transmission ratio and a driving torque distribution ratio.

Accordingly, the determined target braking pressure and the determined target motor torque may be respectively applied to actuators of a braking device and an electric motor, and thus may respectively actuate the braking device and the electric motor. Accordingly, it is possible to estimate a road surface friction coefficient while a vehicle speed is maintained such that a driver does not feel the sense of difference.

Besides, the road surface friction coefficient estimating step S400 may further include a wheel speed difference determining step S410 of receiving wheel speeds of the vehicle from a wheel coupled to the axle, to which the braking force is applied, and a wheel coupled to the axle, to which the driving force is applied, and determining a magnitude of a difference between the wheel speeds.

Accordingly, the wheel speed difference determined in the wheel speed difference determining step S410 appears to be great when the road surface friction coefficient is in the low friction state; the wheel speed difference appears to be small when the road surface friction coefficient is in the high friction state. That is, as shown in FIG. 3C, in the low friction state, a line of the measured front wheel speed is greatly spaced from a line of the measured rear wheel speed, and thus the difference between the measured front wheel speed and the measured rear wheel speed is also great. Moreover, in the high friction state, the line of the measured front wheel speed is slightly spaced from the line of the measured rear wheel speed, and thus the difference between the front wheel speed and the rear wheel speed is small as compared with the low friction state.

Also, the road surface friction coefficient estimating step S400 may further include a wheel speed difference correcting step S420 of determining a wheel speed difference index value by multiplying the wheel speed difference and a correction coefficient having a value between 0 and 1.

At the present time, when the total sum of driving torques applied to an axle of the vehicle, to which the driving force is applied, is small, the correction coefficient close to 1 may be applied; when the total sum of driving torques applied to an axle of the vehicle, to which the driving force is applied, is great, the correction coefficient close to 0 may be applied. Accordingly, when the total sum of driving torques is great, the wheel speed difference caused due to wheel speed reduction may have a minimal effect on the estimation of a road surface friction coefficient.

Furthermore, the road surface friction coefficient estimating step S400 may further include a road surface friction coefficient estimating step S430 of comparing the wheel speed difference index value with a preset road surface friction coefficient threshold, estimating that the road surface friction coefficient is in a low friction state, when the wheel speed difference index value is greater than the road surface friction coefficient threshold, and estimating that the road surface friction coefficient is in a high friction state, when the wheel speed difference index value is less than the road surface friction coefficient threshold.

At the present time, the road surface friction coefficient threshold for distinguishing between a low friction state and a high friction state may be set to a value within a specific range obtained through repeated experiments in a vehicle driving on a road surface.

Besides, in the road surface friction coefficient estimating step S400, as well as a different road surface friction coefficient value is set to be determined based on the difference from the road surface friction coefficient threshold, a road surface friction coefficient may be set to be determined as an specific medium value between the low and high friction states.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

Therefore, embodiments of the present invention are not intended to limit the technical spirit of the present invention, but provided only for the illustrative purpose. The scope of protection of the present invention may be construed by the attached claims, and all equivalents thereof may be construed as being included within the scope of the present invention.

The present invention may preemptively estimate a road surface friction coefficient, even in an inertial driving area where a vehicle is not accelerated or decelerated.

Furthermore, while a driver does not feel the sense of the sense of difference due to the addition of braking force when a vehicle is driving, the present invention may stably estimate a road surface friction coefficient by use of a wheel speed difference caused by the added braking force, by adding a braking force to an axle of the vehicle to which the braking force of the vehicle being driven is applied, and adding a driving force configured for canceling the braking force to an axle of the vehicle to which the driving force is applied.

Besides, a variety of effects directly or indirectly understood through the specification may be provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A road surface friction coefficient estimation apparatus comprising:
   one or more sensor configured to obtain an information of a speed of a vehicle and driving torque at wheels of the vehicle; and
   a processor coupled to the one or more sensor, and configured to:
   determine a driving state of the vehicle by collecting information for grasping a driving situation of the vehicle, and to determine whether to estimate a road surface friction coefficient according to a result of determining the driving state of the vehicle;
   arbitrarily add a braking force, which causes a wheel speed difference, to an axle of the vehicle to which the braking force is applied, and to add a driving force canceling the braking force to an axle of the vehicle, to which the driving force is applied, when the processor determines that the driving state of the vehicle is an inertial driving state; and
   estimate a state of the road surface friction coefficient by the wheel speed difference caused by the arbitrarily added braking force,
   wherein the processor is further configured to:
   obtain wheel speeds of the vehicle from a wheel coupled to the axle, to which the braking force is applied, among the wheels and a wheel coupled to the axle, to which the driving force is applied, among the wheels;
   determine a magnitude of the wheel speed difference between the wheel speeds; and
   determine a value of the wheel speed difference as a corrected wheel speed difference index value by multiplying the determined wheel speed difference by a predetermined correction coefficient, depending on a magnitude of a target driving torque acting on the axle, to which the driving force is applied.

2. The apparatus of claim 1, wherein the processor is further configured to:
   obtain at least one of a longitudinal acceleration or the wheel speeds of the vehicle, for estimating a vehicle speed of the vehicle which is driving;
   obtain at least one of a lateral acceleration, a steering angle, a steering angular speed, or a yaw rate of the vehicle, for determining whether the vehicle is driving straight; and
   obtain a value of a motor torque, for determining a static driving state of the vehicle.

3. The apparatus of claim 2, wherein the processor is further configured to:
   estimate the vehicle speed of the vehicle being driven; and
   estimate a wheel torque applied to each of front and rear wheels of the vehicle being currently driven among the wheels.

4. The apparatus of claim 2, wherein the processor is further configured to:
   determine whether the vehicle is currently driving straight.

5. The apparatus of claim 4, wherein the processor is further configured to:
   determine whether the vehicle is in the static driving state, by comparing a current wheel torque value of the vehicle being driven with a predetermined reference value.

6. The apparatus of claim 1, wherein
   the processor is further configured to set a value of a final braking force that finally acts on the axle, to which the braking force is applied, for braking of the vehicle being driven.

7. The apparatus of claim 6, wherein the processor is further configured to:
   determine a target braking force to be added to the axle to which the braking force is applied so that the final braking force is configured for being applied by overcoming a current driving force applied to the vehicle; and
   determine a driving force, of which a magnitude is equal to a magnitude of the target braking force and which is applied in a direction opposite to a direction of the target braking force, as a target driving force to be added to the axle, to which the driving force is applied so that a speed of the vehicle is maintained by canceling the target braking force.

8. The apparatus of claim 7, wherein
   the processor is further configured to determine the target braking torque and the target driving torque by multiplying the target braking force and the target driving force by a radius of each tire provided on the axle, to which the braking force is applied, and the axle to which the driving force is applied.

9. The apparatus of claim 8, wherein the processor is further configured to:
   determine a target braking pressure to be implemented in a braking device of the vehicle by dividing the target braking torque by a brake gain and a tire effective radius; and
   determine a target motor torque to be implemented in an electric motor of the vehicle by dividing the target driving torque by a driving torque gear transmission ratio and a driving torque distribution ratio.

10. The apparatus of claim 1, wherein the processor is configured to determine the wheel speed difference index value by applying a correction coefficient which is relatively high, from among correction coefficients having values between 0 and 1 when a value of a final driving torque which is a sum of driving torques applied to the axle, to which the driving force is applied, is smaller than a predetermined value and by applying the correction coefficient which is relatively low, from among the correction coefficients having the values between 0 and 1 when the value of the final driving torque is greater than the predetermined value.

11. The apparatus of claim 1, wherein
   the processor is further configured to determine whether a road surface on which the vehicle is driving is in a low friction state or a high friction state, by comparing the wheel speed difference index value with a predetermined road surface friction coefficient threshold.

12. A method of estimating a road surface friction coefficient, the method comprising:
collecting, by a processor, information for determining a speed of a vehicle from sensors mounted in the vehicle;
determining, by the processor, whether to estimate the road surface friction coefficient by determining whether the vehicle is in an inertial driving state, according to the collected information;
arbitrarily adding, by the processor, a braking force causing a wheel speed difference to an axle of the vehicle, to which the braking force is applied, and adding a driving force for canceling the braking force, to an axle of the vehicle to which the driving force is applied, when the processor determines that the vehicle is the inertial driving state; and
estimating, by the processor, a state of the road surface friction coefficient by the wheel speed difference caused by the arbitrarily added braking force,
wherein the estimating of the road surface friction coefficient includes:
receiving wheel speeds of the vehicle from a wheel coupled to the axle, to which the braking force is applied, and a wheel coupled to the axle, to which the driving force is applied;
determining a magnitude of the wheel speed difference between the wheel speeds; and
determining a value of the wheel speed difference as a corrected wheel speed difference index value by multiplying the wheel speed difference, which is determined in the determining of the magnitude of the wheel speed difference between the wheel speeds, by a predetermined correction coefficient, depending on a magnitude of a target driving torque acting on the axle, to which the driving force is applied.

13. The method of claim 12, wherein the collecting of the information includes:
determining a value of a wheel torque applied to each of a front wheel and a rear wheel of the vehicle by a driving source driving torque being a motor torque collected from a sensor mounted in the vehicle.

14. The method of claim 12, wherein the determining of whether to estimate the road surface friction coefficient includes:
determining whether the vehicle is currently driving straight, according to the collected information; and
determining whether the vehicle is in a static driving state, by comparing a current wheel torque value of the vehicle being driven, with a predetermined reference value when it is determined that the vehicle is driving straight.

15. The method of claim 12, wherein the addition of the braking forces includes:
setting a final braking force that finally acts on the axle, to which the braking force is applied, for braking of the vehicle being driven;
determining a target braking force to be added to the axle to which the braking force is applied so that the set final braking force is configured for being applied, and a target driving force to be added to the axle, to which the driving force is applied so that a speed of the vehicle is maintained by canceling the target braking force, and
determining a target braking torque and a target driving torque, which are applied to each of a front wheel and a rear wheel of the vehicle, as a target wheel torque when the target braking force is added to the axle to which the braking force is applied and the target driving force is added to the axle to which the driving force is applied.

16. The method of claim 15, wherein the addition of the braking forces includes:
determining a target braking pressure to be applied to a braking device of the vehicle as a control amount of the braking device to implement the target braking torque; and
determining the target motor torque to be applied to an electric motor of the vehicle as a control amount of the electric motor to implement the target driving torque.

17. The method of claim 12, wherein the estimating of the road surface friction coefficient further includes:
comparing the wheel speed difference index value with a predetermined road surface friction coefficient threshold;
estimating that the road surface friction coefficient is in a low friction state, when the wheel speed difference index value is greater than the road surface friction coefficient threshold; and
estimating that the road surface friction coefficient is in a high friction state, when the wheel speed difference index value is less than the road surface friction coefficient threshold.

* * * * *